United States Patent [19]

Iwashita et al.

[11] Patent Number: 5,656,906
[45] Date of Patent: Aug. 12, 1997

[54] AUTOMATIC ADJUSTING METHOD OF SERVO PARAMETERS AND AUTOMATIC ADJUSTING APPARATUS OF THE SAME

[75] Inventors: Yasusuke Iwashita; Kaname Matsumoto; Tadashi Okita, all of Oshino-mura, Japan

[73] Assignee: Fanuc Ltd., Japan

[21] Appl. No.: 597,960

[22] Filed: Feb. 7, 1996

[30] Foreign Application Priority Data

Feb. 10, 1995 [JP] Japan .................... 7-045010

[51] Int. Cl.6 .................................. G05B 19/00
[52] U.S. Cl. ............... 318/568.23; 318/632; 364/474.35
[58] Field of Search ........................ 318/560, 567, 318/568.1, 568.11, 568.12, 568.22, 568.23, 568.24, 568.25, 632; 364/474.02, 474.11, 474.35

[56] References Cited

U.S. PATENT DOCUMENTS

4,293,913 10/1981 Nishimura et al. .
4,540,923 9/1985 Kade et al. .
5,475,291 12/1995 Yoshida et al. ................ 318/568.22

Primary Examiner—Bentsu Ro
Attorney, Agent, or Firm—Staas & Halsey

[57] ABSTRACT

A servo parameter adjusting program is sent out from a servo parameter automatic adjusting apparatus to a servo controller of a servo control system, to cause the servo control system to perform an operation in accordance with this adjusting program and servo parameters presently stored in the servo controller. Then, the servo parameter automatic adjusting apparatus receives servo information obtained when the servo control system performs the adjusting program. A judgement is made as to whether or not the servo parameters set for the execution of the adjusting program is adequate. When the servo parameters set for the execution of the adjusting program are inappropriate, the servo parameter automatic adjusting apparatus performs a renewal adjustment of the servo parameter, thereby renewing the servo parameters stored in the servo controller.

6 Claims, 7 Drawing Sheets

BEFORE ADJUSTMENT

F I G. 6B

AFTER ADJUSTMENT
OF FEEDFORWARD COEFFICIENT

F I G. 6C

AFTER ADJUSTMENT
OF FEEDFORWARD AND CORRECTION
OF QUADRANT PROJECTION

F I G. 7A

F I G. 7B

AUTOMATIC ADJUSTING METHOD OF SERVO PARAMETERS AND AUTOMATIC ADJUSTING APPARATUS OF THE SAME

BACKGROUND OF THE INVENTION

1. Field of the Invention

The present invention relates to a method and an apparatus for automatically adjusting servo parameters used in a servo control system including a servo motor for driving a feed shaft of a machine tool, an industrial machine, a robot arm and the like.

2. Description of the Related Art

For controlling a servo motor which drives a feed shaft of a machine tool or an industrial machine, an arm of an industrial robot, or the like, it is necessary to properly set servo parameters for the servo control system including the servo motor. These servo parameters determine the responsibility in the speed loop or the position loop, and therefore need to be adjusted depending on the characteristics of individual objects to be controlled.

For this purpose, actual responsibility of the servo control system is measured so that various servo parameters can be adjusted based on the result of the measurement.

Conventionally, the responsibility of such servo control systems has been measured using measuring devices and general-purpose computing devices. However, the adjustment of servo parameters to be made based on such result of measurement has been largely dependent on operators' personal experience and perception. In addition, adjusted servo parameters are manually set in the servo control systems by operators.

For this reason, the adjustment of servo parameters tend to be affected by the personal difference of individual operators. In addition, it has been a problem that parameter adjustment and the following setting work of the adjusted resultant servo parameters require a considerable length of time.

OBJECTS AND SUMMARY OF THE INVENTION

The object of the present invention is to provide a method and an apparatus capable of automatically adjusting servo parameters for the servo control system.

According to the servo parameter automatic adjusting method of the present invention, a servo parameter adjusting program is sent out from a servo parameter automatic adjusting apparatus to a servo controller in a servo control system, causing the servo control system to perform an operation in accordance with this adjusting program and servo parameters currently stored in the servo controller. Then, the servo parameter automatic adjusting apparatus receives servo information made available by the execution of the adjusting program by the servo control system to determine whether or not the servo parameters used for the execution of the adjusting program is adequate. When it is determined that the servo parameter used for the execution of the adjusting program is inadequate, the servo parameter automatic adjusting apparatus alters the servo parameter, thereby updating the servo parameters stored in the servo controller. Then, based on thus updated servo parameters, the same operation is performed again to determine whether the updated servo parameter is appropriate or not. The above processing is repeated until an adequate servo parameter is obtained.

BRIEF DESCRIPTION OF THE DRAWINGS

The foregoing and other objects, features and advantages of the present invention will become apparent from the following detailed description of preferred embodiments of the present invention with reference to the accompanying drawings, in which.

DETAILED DESCRIPTION OF THE PREFERRED EMBODIMENTS

Figure 1:
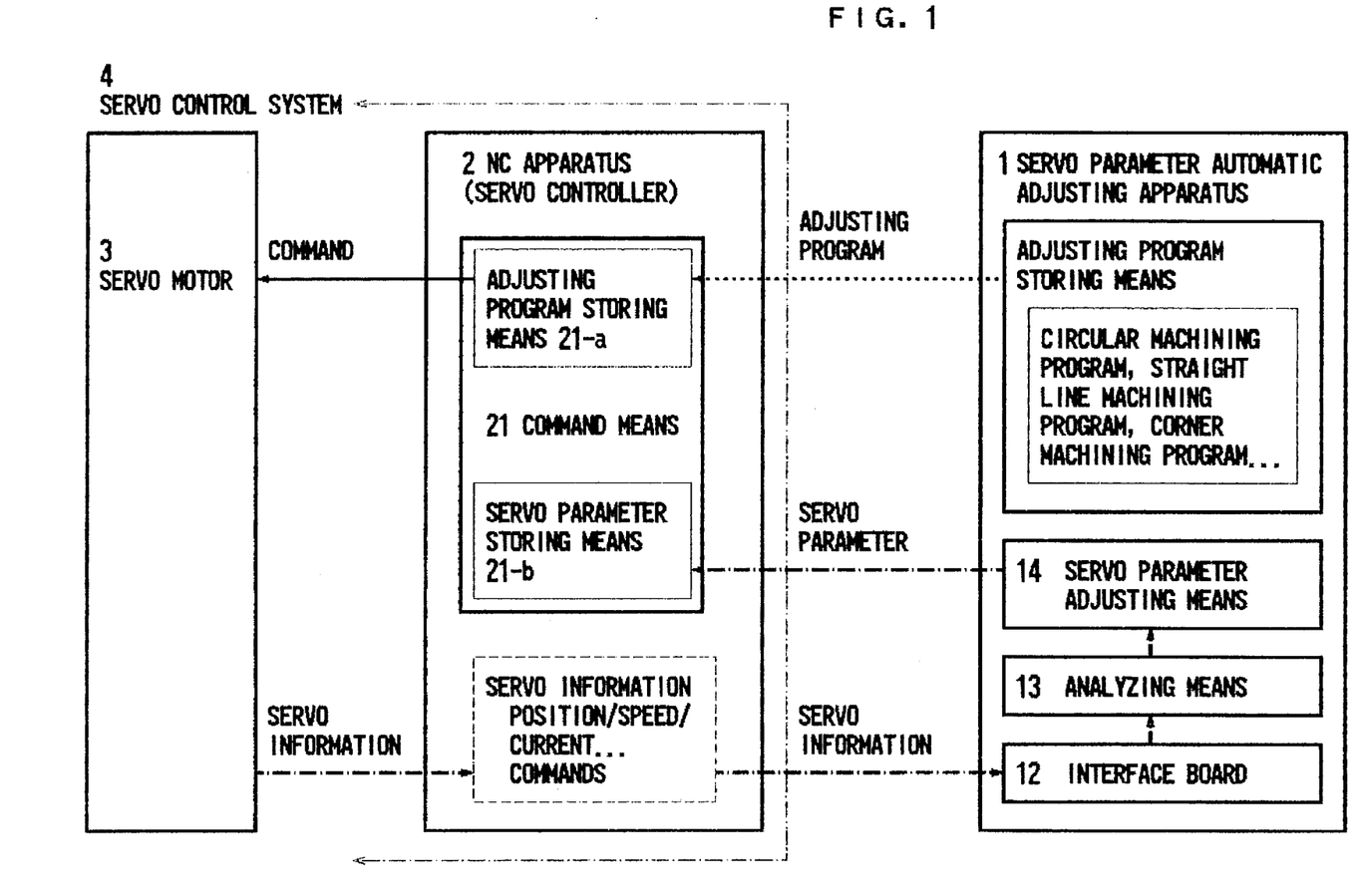
FIG. 1 is a block diagram schematically illustrating functions of a servo control system and an associated servo parameter automatic adjusting apparatus in accordance with the present invention.

A preferred embodiment of the present invention will be outlined with reference to FIG. 1 which illustrates the arrangement of an apparatus designed for automatically adjusting servo parameters in accordance with the present invention.

In FIG. 1, reference numeral 1 represents a servo parameter automatic adjusting apparatus. Reference numeral 4 represents a servo control system whose servo parameters are adjusted by servo parameter automatic adjusting apparatus 1. Servo control system 4 comprises an NC apparatus (servo controller) 2 and a servo motor 3 controlled by NC apparatus 2. The servo motor 3 drives feed shafts of machine tools, industrial machines, arms of robots and the like.

The servo parameters, as objects of automatic adjustment, are the parameters determining responsibility of servo control system 4, and will include, for example, gains, inertia, and backlash correction values.

When servo control system 4 drives an object of control through servo motor 3, normally the servo control system 4 is physically or electrically separated from servo parameter automatic adjusting apparatus 1. Servo parameter automatic adjusting apparatus 1 adjusts the servo parameters before servo control system 4 actually starts its operation so that proper responsibility to the action can be obtained. Thus, delivery and receipt of data between servo parameter automatic adjusting apparatus 1 and servo control system 4 is made only when the adjustment of servo parameters for the servo control system 4 is necessary.

Servo parameter automatic adjusting apparatus 1 comprises adjusting program storing means 11, interface board 12, analyzing means 13, and servo parameter adjusting means 14.

Adjusting program storing means 11 stores the adjusting program which is used to make servo control system 4 perform predetermined operations. More specifically, the adjusting program includes the circular machining program causing a circular arc movement, the straight line machining program causing a linear movement and the corner machining program causing a cornering movement.

By trying the predetermined operations in accordance with this program, the responsibility based on the servo parameters set in the servo control system 4 is measured. Then, servo parameters are adjusted according to the measured responsibility.

Interface board 12 receives servo information sent out of NC apparatus 2. The servo information represents response characteristics in the operations of servo control system 4, that is, a locus of the actual operations of servo control system 4. For example, the servo information include various data representing position, speed, current and others in servo control system 4.

Analyzing means 13 analyzes the servo information inputted through interface board 12, obtains the response characteristics of servo control system 4, and judges whether or not the response characteristics is proper.

The servo parameter adjusting means 14 determines the values of the parameters which will optimize the response characteristics of the servo control system, according to the responsibility of the servo control system which was obtained by the analyzing means 13. Then the determined values of the parameters are fed to the NC apparatus 2.

On the other hand, NC apparatus 2 of servo control system 4 includes a command means 21 which comprises an adjusting program storing means 21-a and a serve parameter storing means 21-b. The adjusting program storing means 21-a receives and stores the adjusting program sent out of servo parameter automatic adjusting apparatus 1, while servo parameter storing means 21-b stores the values of the servo parameters.

The adjusting program storing means 21-a sends out commands to servo motor 3 based on the adjusting program stored in itself and the servo parameters stored in servo parameter storing means 21-b. The servo parameter storing means 21-b stores initial servo parameters of the servo control system 4 and servo parameters received from servo parameter automatic adjusting apparatus 1. In this case, the initial servo parameters may be renewed by the servo parameters which are outputted from the servo parameter automatic adjusting apparatus 1.

NC apparatus 2 also has a function of receiving servo information made available in servo motor 3 and sending the same to servo parameter automatic adjusting apparatus 1.

Next, the hardware arrangement of servo parameter automatic adjusting apparatus 1 show in FIG. 1 will be explained with reference to FIG. 2.

A processor 100, designed for overall control of servo parameter automatic adjusting apparatus 1, is connected via bus 107 to each of ROM 101, disk devices 102, 104, RAM 103, and interfaces 105, 106.

ROM 101 stores the system program designed for overall control of servo parameter automatic adjusting apparatus 1. This program is read out by CPU 100.

The memory in disk device 102 and the like store various programs, such as the circular machining program, straight line program, corner program previously described, for making servo control system 4 perform predetermined operations. The memory in disk device 104 stores the system program for executing various processing such as the automatic adjusting mode processing, servo information input processing, servo information analysis processing, servo parameter computing processing based on the result of analysis, and output processing for sending out the calculated servo parameters to NC apparatus 2. The programs stored in disk devices 102 and 104 are read out and transferred to NC apparatus 2.

RAM 103 stores temporary computation data, display data, and various input data entered through CRT/MDI unit 110 by operators. Furthermore, other data such as allowable values and coefficients to be used for adjusting servo parameters can be stored in RAM 103.

Interface 105 is for connecting servo parameter automatic adjusting apparatus 1 to NC apparatus 2, so that the servo information can be received from NC apparatus 2 through interface 105 while the servo parameters and the adjusting program can be supplied to NC apparatus Data signals, including automatic adjusting mode conditions of servo parameters, type of an operating program to be or being adjusted, servo information, allowable values, results of analyses, and adjusted servo parameter values, are sent through interface 106 to a data input apparatus with a display (CRT/MDI unit) 110 and displayed on its monitor. This CRT/MDI unit 110 is a manual data input device comprising a processor, memories, a display and a keyboard. Interface 106 receives data from CRT/MDI unit 110 and sends the same to processor 100. Furthermore, CRT/MDI unit 110 processes for display the data received from processor 100 and displays the processed data on its monitor.

Figure 3:
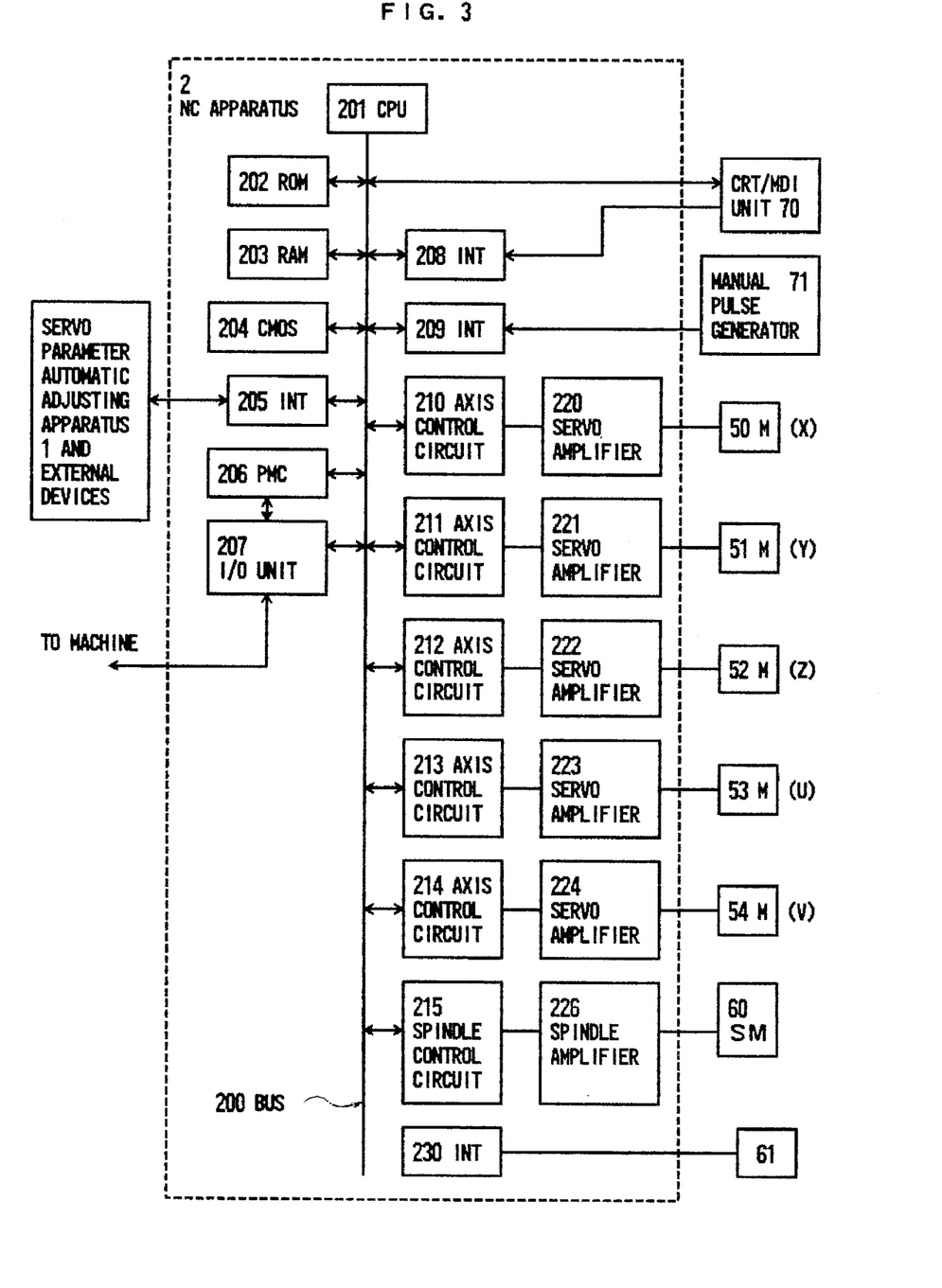
FIG. 3 is block diagram showing a hardware arrangement of a servo controller in the servo control system shown in FIG. 1.

Next, the hardware arrangement of servo control system 4 will be explained with reference to FIG. 3.

The processor (CPU) 201 is for overall control of NC apparatus 2, and is connected via bus 200 to ROM 202, RAM 203, CMOS 204, interfaces 205, 208, 209, 230, programmable machine controller (PMC) 206, input/output unit (I/O unit) 207, axis control circuits 210–214, and spindle control circuit 215.

ROM 202 stores the system program. CPU 201 reads out this system program via bus 200, and performs the overall control of NC apparatus 2 in accordance with this system program. Furthermore, ROM 202 stores system programs for executing various processings, such as an editing mode processing required in producing and editing each machining program, a reproduction mode processing for automatic operation, a simulation mode processing, and a servo parameter adjusting mode processing.

RAM 203 stores temporary computation data, display data, various data entered through CRT/MDI unit 70 by operators, and servo parameters needed for the servo control. CMOS memory 204 is backed up by a battery (not shown), and serves as a nonvolatile memory capable of storing memory data even when NC apparatus 2 is turned off. This CMOS memory 204 stores machining programs entered through interface 205 and another machining programs entered from CRT/MDI unit 70 through interface 208.

Interface 205 is for connecting NC apparatus 2 to various I/O devices, external devices such as external memories (not shown), and servo parameter automatic adjusting apparatus 1. More specifically, by the aid of this interface 205, NC apparatus 2 can read machining programs from the external devices, and is capable of sending out edited machining programs to the external memories or output devices. Furthermore, servo parameter automatic adjusting apparatus 1, when it is connected to interface 205, can give to and receive from NC apparatus 2 the adjusting program and servo information.

PMC 206 controls an auxiliary apparatus associated with a machine tool, including actuators such as a robot hand for tool change, in accordance with the sequence program stored in NC apparatus 2. More specifically, the sequence program converts signals into those signals required by the auxiliary apparatus in accordance with M function, S function and T function commanded by the machining program. Thus converted signals are sent out through I/O unit 207 to the auxiliary apparatus. Responding to these output signals, the auxiliary apparatuses such as various actuators start their operations.

Besides, PMC 206 receives signals from limit switches of the machine tool itself, its auxiliary apparatus, and switches on the operation board of the machine tool, processes these received signals, and thereafter sends them to CPU 201.

Data signals, such as those corresponding to present positions of respective axes of the machine tool, alarms, servo parameters, shift commands to the axes during simulation, and servo information, are sent to CRT/MDI unit 70 and displayed on its monitor. CRT/MDI unit 70 is a manual data input device comprising a processor, memories, a display and a keyboard. Interface 208 receives data from CRT/MDI unit 70 and sends the same to CPU 201. Furthermore, CRT/MDI unit 70 processes the data received from CPU 201 for display on its monitor.

Interface 209 is connected to manual pulse generator 71 and receives pulses generated therefrom. Manual pulse generator 71 is mounted on the operation board of the machine tool, thereby enabling an operator to precisely determine shift the position of a movable part or member of the machine tool by controlling each axis thereof based on distribution pulses generated by manual operation of the manual pulse generator 71.

Axis control circuits 210–214 receive shift command for each axis from CPU 201 and then output axis commands to corresponding servo amplifiers 220–224. Receiving these commands, servo amplifiers 220–224 actuate servo motors 50–54 to drive respective axes of the machine tool. Each of servo motors 50–54 is equipped with a position detecting pulse coder (not shown). A position signal generated from this pulse coder is fed back by pulse train or serial transfer. Alternatively, a linear scale can be used as a position detector.

When the pulse train is used, it can be converted into speed data through F/V (frequency/speed) conversion. In the case that serial data is used, it can be changed into speed data by obtaining a differential of an absolute position. FIG. 2 omits the explanation of feedback of this position signal and speed feedback.

Spindle control circuit 215 receives a spindle rotation command for the machine tool, and outputs a spindle speed signal to spindle amplifier 226. Receiving this spindle speed signal, spindle amplifier 226 rotates spindle motor 60 of the machine tool at a commanded rotational speed.

Spindle motor 60 is connected to position coder 61 by means of gears or a belt, whereby the position coder 61 generates feedback pulses synchronously with the rotation of the spindle, and CPU 201 reads the feedback pulses through interface 230.

The above-described position feedback signals, speed feedback signals, and current and feedback pulses from axis control circuits can be used as servo information in the automatic adjustment of servo parameters. The axis control circuits 210–214 receive feedback currents from motors 50–54 through servo amplifiers 220–224.

The arrangement of the above-described NC apparatus 2 is conventionally known and therefore will not be explained in more detail.

Figure 4:
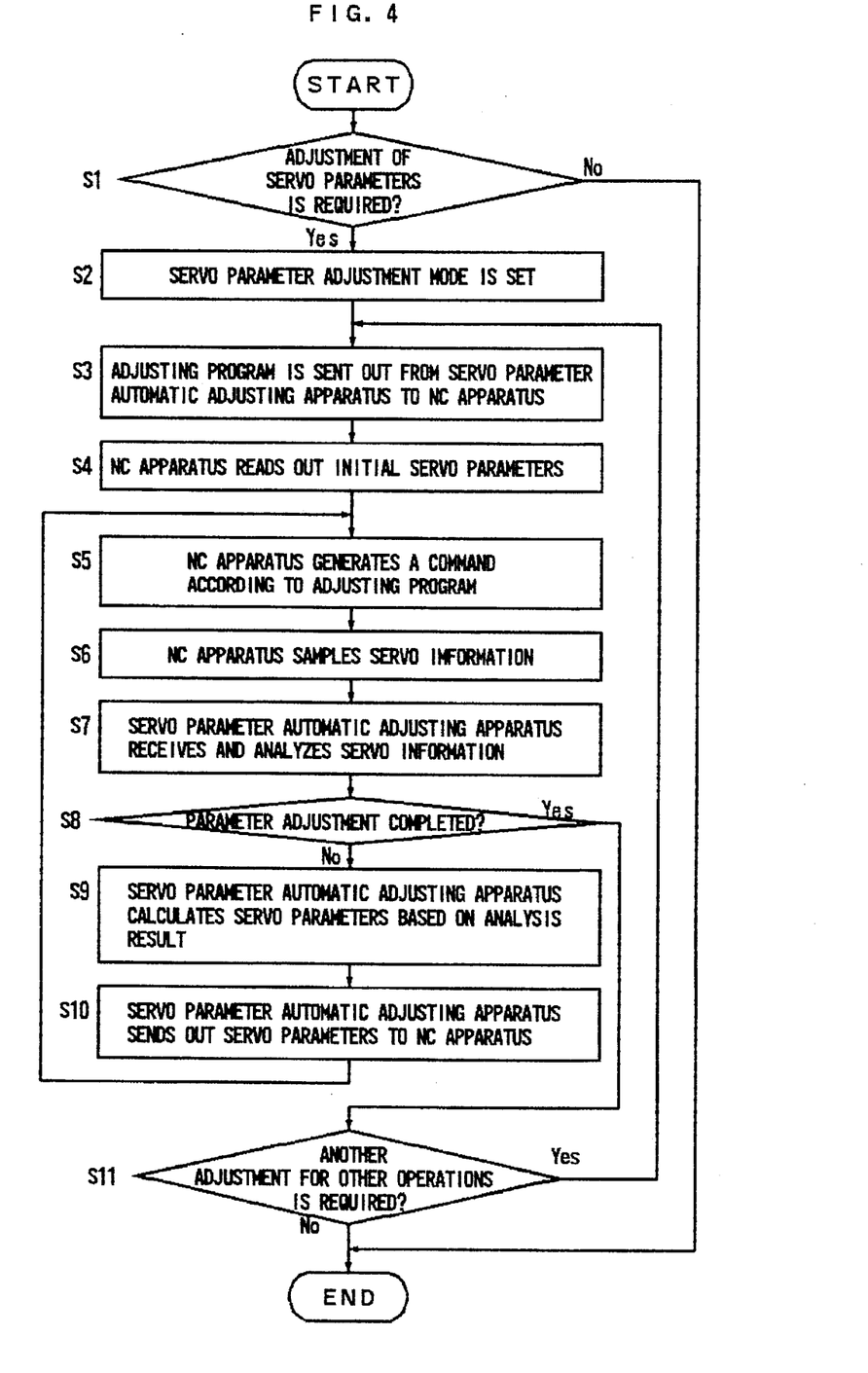
FIG. 4 is a flow chart showing the procedure of the servo parameter automatic adjustment in accordance with the present invention.

Next, the automatic adjustment of servo parameters in accordance with the present invention will be schematically explained with reference to the block diagram of FIG. 1 and the flow chart of FIG. 4.

First, it is judged whether or not the adjustments of servo parameters are necessary (Step S1). When the servo control system 4 requires the adjustment of servo parameters, servo parameter automatic adjusting apparatus 1 is connected to NC apparatus 2 of servo control system 4 in order to make possible the adjustment of servo parameters. Then, servo parameter automatic adjustment apparatus 1 is set to the servo parameter adjustment mode. The conversion of mode to the servo parameter adjustment mode is, for example, can be made by changing the mode conversion parameter in servo parameter automatic adjustment apparatus 1 in responsibility to an external signal (Step S2).

The servo parameter adjusting mode allows the servo parameter automatic adjusting apparatus 1 to select servo parameter adjusting programs from among those stored in adjusting program storing means 11, and send out the selected operation program to NC apparatus 2. The selection of this adjusting program can be carried out in responsibility to an external signal or an internal signal (Step S3).

NC apparatus 2 receives the selected adjusting program and temporarily stores it in the adjusting program storing means 21-a, while reading out initial servo parameters stored beforehand in NC apparatus 2. These initial servo parameters are read out according to the operations to be adjusted (Step S4). Subsequently, NC apparatus B outputs commands to servo motor 3 in accordance with the selected adjusting program and the initial servo parameters (Step S5).

Servo motor 3 and servo control system 4 operate in accordance with these commands. NC apparatus 2 samples the servo information representing the response characteristics of the operation of servo control system 4, and send them to servo parameter automatic adjusting apparatus 1. Such servo information includes, for example, position data, speed data and current data (Step S6).

Servo parameter adjusting means 11 of servo parameter automatic adjusting apparatus 1 receives the servo information from NC apparatus 2 and analyzes the same for evaluating the response characteristics of the servo control system 4. Such analyses can be carried out, for example, by obtaining a difference between the sampled value and a predetermined reference value (Step S7).

When the response characteristics of the servo control system 4 obtained in step S7 is found not satisfactory compared with the reference value, it is concluded that the servo parameter presently set for the servo control system is not adequate, and, the processing proceeds to the next step S9 to adjust the servo parameters. On the other hand, when the response characteristics of the servo control system 4 is found meeting the requirement, it is concluded that the servo parameters presently set for the servo control system are adequate, and the processing proceeds to the step S11 (Step S8).

When the adjustment of servo parameters has not yet been completed in step S8, servo parameters are calculated based on the result of the analysis carried out in step S7 (Step S9). Subsequently, servo parameter adjusting means 14 of servo parameter automatic adjusting apparatus 1 sends the calculated servo parameters to NC apparatus 2 (Step S10).

NC apparatus 2 stores thus sent-out servo parameters in servo parameter storing means 21-b, thereby updating the stored values of servo parameters. Thereafter, processing returns to step S5 to actuate servo control system 4 based on the updated servo parameters, and servo information and the result of analysis are obtained through steps S8 and S7, thereby evaluating the response characteristics of the servo control system 4.

In this manner, the processings of steps S5 through S10 are repeated until the servo control system 4 acquires appropriate response characteristics.

Once the servo parameters which can provide satisfactory response characteristics for the servo control system 4 are obtained in step S8, another judgement is made as to whether the similar processing should be performed for other programs performing other operations (Step S11).

In case the servo parameters need to be adjusted on other programs for performing other operations, the processing returns to step S3 to make the servo parameters automatic adjusting means 1 send out the adjusting program corresponding to the operation to be adjusted to NC apparatus 2, thereby executing the above-described processing (steps S4 through S10).

If other operations are not required any more, this sequence will be ended. As a result, servo parameters of servo control system 4 to be stored in NC apparatus 2 will be adjusted to the values assuring appropriate response characteristics, thereby completing the automatic adjustment of the servo parameters.

Next, the function of automatic adjustment of servo parameters of the present invention will be explained in more detail, taking an example on the adjustment of feedforward coefficients serving as servo parameters in the circular machining program, referring to block diagram of FIG. 2 and flow chart of FIG. 5. It is supposed that servo parameter automatic adjusting apparatus 1 is connected with NC apparatus 2. Furthermore, the flow chart of FIG. 5 corresponds to the processings of steps S1–S9 of the flow chart of FIG. 4.

First, CRT/MDI unit 110 enters the command into servo parameter automatic adjusting apparatus 1 for executing the automatic adjustment of servo parameters. CPU 100 receives this command through interface 106, and starts the servo parameter automatic adjusting operation in accordance with the system program stored in disk device 104. CPU 100 sends out the mode change signal to NC apparatus 2 through interface 105. This mode change signal changes the mode of NC apparatus 2 into a mode allowing NC apparatus 2 to receive the adjusting program from servo parameter automatic adjusting apparatus 1. As a signal line connecting servo parameter automatic adjusting apparatus 1 and NC apparatus 2, for example RS232C may be used (Step T1).

NC apparatus 2, when it has received the mode change signal from servo parameter automatic adjusting apparatus 1, changes its mode to the adjusting program reading mode (Step T2).

RAM 203 of NC apparatus 2 is used as a servo RAM for storing various data, such as servo parameters required in the servo control. For example, RAM 203 stores necessary data such as initial servo parameters in advance. NC apparatus 2, when it receives a special signal (parameter) from servo parameter automatic adjusting apparatus 1, reads out predetermined data from servo RAM 203. To execute this reading-out processing, NC apparatus 2 has a software prepared in advance for reading out the predetermined data from RAM 203 in responsibility to the inputted special signal. For example, data may be read out by making use of a parameter rewriting method with G codes.

Then, servo parameter automatic adjusting apparatus 1 sends out a specific signal to NC apparatus 2 to set NC apparatus 2 capable of reading data from servo RAM (Steps T3 and T4).

Figure 2:
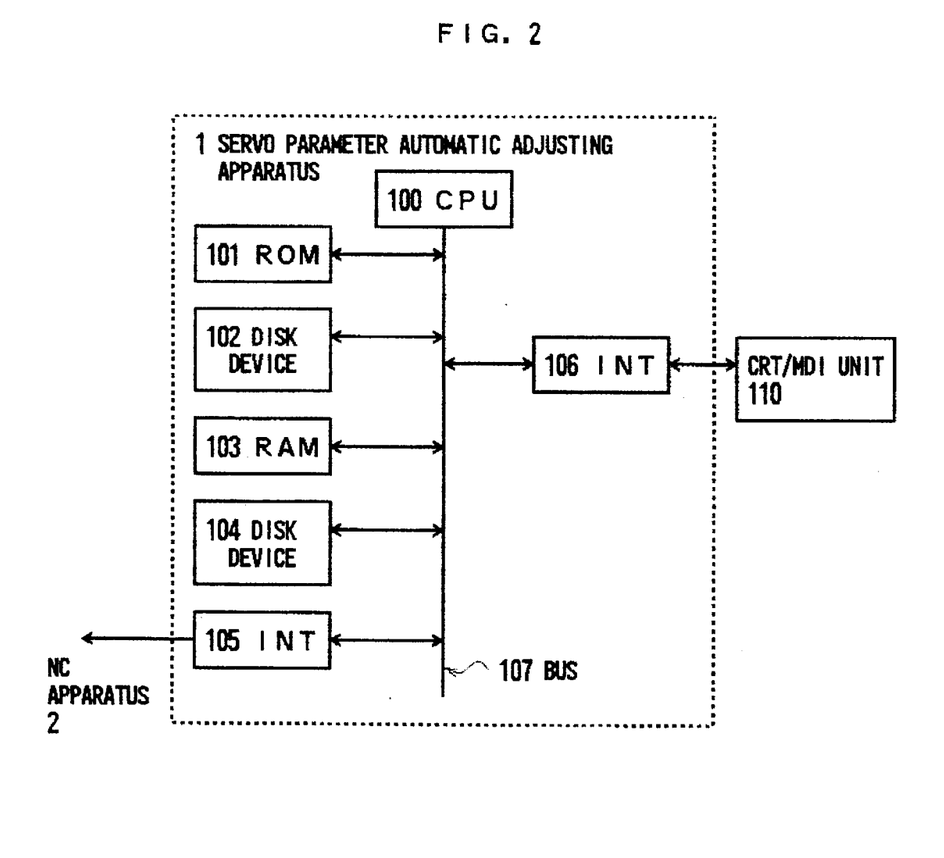
FIG. 2 is a block diagram showing a hardware arrangement of the servo parameter automatic adjusting apparatus shown in FIG. 1.

Next, servo parameter automatic adjusting apparatus 1 sends a command to NC apparatus 2 to output servo information, such as the present position of the motor, to interface board (corresponding to interface 105 in FIG. 2). The command from servo parameter automatic adjusting apparatus i to NC apparatus 2 is transmitted via a signal line such as previously-described RS232C (Step T5).

Servo parameter automatic adjusting apparatus 1 reads out initial values of both a feedforward coefficient and initial value of an increment of feedforward coefficient from RAM 103. In this case, for example, practical initial values for the feedforward coefficient and the initial value of the increment of feedforward coefficient are 90% and 2% respectively (Step T6).

Next, servo parameter automatic adjusting apparatus 1 sends out the readout initial values of the feedforward coefficient and the initial value of the increment of feedforward coefficient to NC apparatus 2. NC apparatus 2 stores these readout values in RAM 203 and the like (Step T7).

Subsequently, servo parameter automatic adjusting apparatus 1 reads out the adjusting program from disk device 102, and sends it out to NC apparatus 2 through interface 105. In this embodiment, the adjusting program to be sent out is a circular machining program (Step T8).

NC apparatus 2, when receiving the adjusting program, immediately starts executing the program. NC apparatus 2 reads the servo information from servo control system 4 while executing the adjusting program. In this embodiment, position data covering one circumference are read out as the servo information. This servo information is then sent to servo parameter automatic adjusting apparatus 1 (Step T9).

Servo parameter automatic adjusting apparatus 1 receives the servo information and stores them into RAM 103 (Step T10). CPU 100 performs the analysis processing based on the servo information. For example, the analysis processing is a calculation of an error in the radial direction of an arc, whereby it becomes possible to obtain a deviation between a desirable reference value defined by the circular machining program and an actual processing result.

More specifically, the radial error of the circular arc can be calculated according to the sequence as follows: Four points on the actual circular arc corresponding to 45°, 135°, 225° and 315° are sampled, respectively; From the coordinate value of each sampled point (xi, yi; where i=1,2,3 and 4), the radius r0 of the circular machining command, and the coordinate value (x0, y0) of the center of the circular arc, the error ∈i can be obtained by the following equation.

$$\epsilon i = \sqrt{[(xi - x0)^2 + (yi - y0)^2]} - r0$$

Then, by calculating an average of values ∈i (i=1,2,3 and 4), a radial error ∈ of the circular arc can be obtained (Step T11).

Then, the adjustment of servo parameters is carried out based on the servo information obtained in step T11. CPU 100 reads out a target allowable value from RAM 103, and compares it with the absolute value of the obtained radial error ∈. When the absolute value of the obtained radial error ∈ is smaller than the target allowable value, it is concluded that the operation according to the given circular machining program will follow a desired reference locus. In other words, it means that the servo parameters in servo control system 4 are appropriate for this circular machining program. Hence, the adjusting program for the servo parameters is accomplished at this point.

On the other hand, when the absolute value of the obtained radial error ε is larger than the target allowable value, it is concluded that the operation according to the given circular machining program will deviate from the desired reference locus. In other words, it means that the servo parameters in servo control system 4 are not appropriate for this circular machining program. Hence, the adjustment for the servo parameters is started according to steps T13 through (Step T12).

Normally, when the initial value of the feedforward coefficient is set to a low value, a distance "r" between a point (x,y) on an actual circular arc and the center (x0,y0) of the commanded circular arc, that is, $$r = \sqrt{[(x-x0)^2 + (y-y0)^2]}$$

becomes smaller than the reference radius r0 of the commanded circular arc.

Thus, the radial error ε becomes a negative value. Accordingly, in this case, the sign of radial error ε is judged to be negative in step T13.

When the radial error ε is negative, the calculation shown in step T14 is performed to adjust the feedforward coefficient, so as to increase the feedforward coefficient. For example, this calculation can be performed according to the following equation.

Feedforward Coefficient=Feedforward Coefficient +Increment of Feedforward Coefficient Using the feedforward coefficient updated based on the above equation, the processings of steps T8 through T11 are performed again.

In step T12, if the absolute value of the radial error ε is smaller than the target allowable value, this feedforward coefficient becomes an adjusted feedforward coefficient, and this servo parameter is sent out to servo control system 4.

On the other hand, when the absolute value of the radial error ε is still larger than the target allowable value, the judgement by step T13 is executed again. If the sign of radial error ε is still negative in step T13, the feedforward coefficient is further increased in step T14.

On the contrary, when the sign of radial error ε is found to be positive in step T13, it means that the feedforward coefficient is increased too much, and so the feedback coefficient is reduced in steps T15 and T16. More specifically, in step T15, the increment value of the feedforward coefficient is reduced to a half. Then, in step T16, the feedforward coefficient reduced to a half is subtracted from the excessive feedforward coefficient, thereby reducing the feedforward coefficient. Although the increment value of the feedforward coefficient is reduced into half in the steps T15 and T16, it is needless to say that the reduction degree of the increment value can be arbitrarily set to a positive value not exceeding 1.

Next, the processings of steps T8 through T11 are executed again based on the feedforward coefficient renewed in steps T15 and T18, and steps T8 through T16 are repeated again until the radial error ε becomes smaller than the target allowable value.

Figure 5:
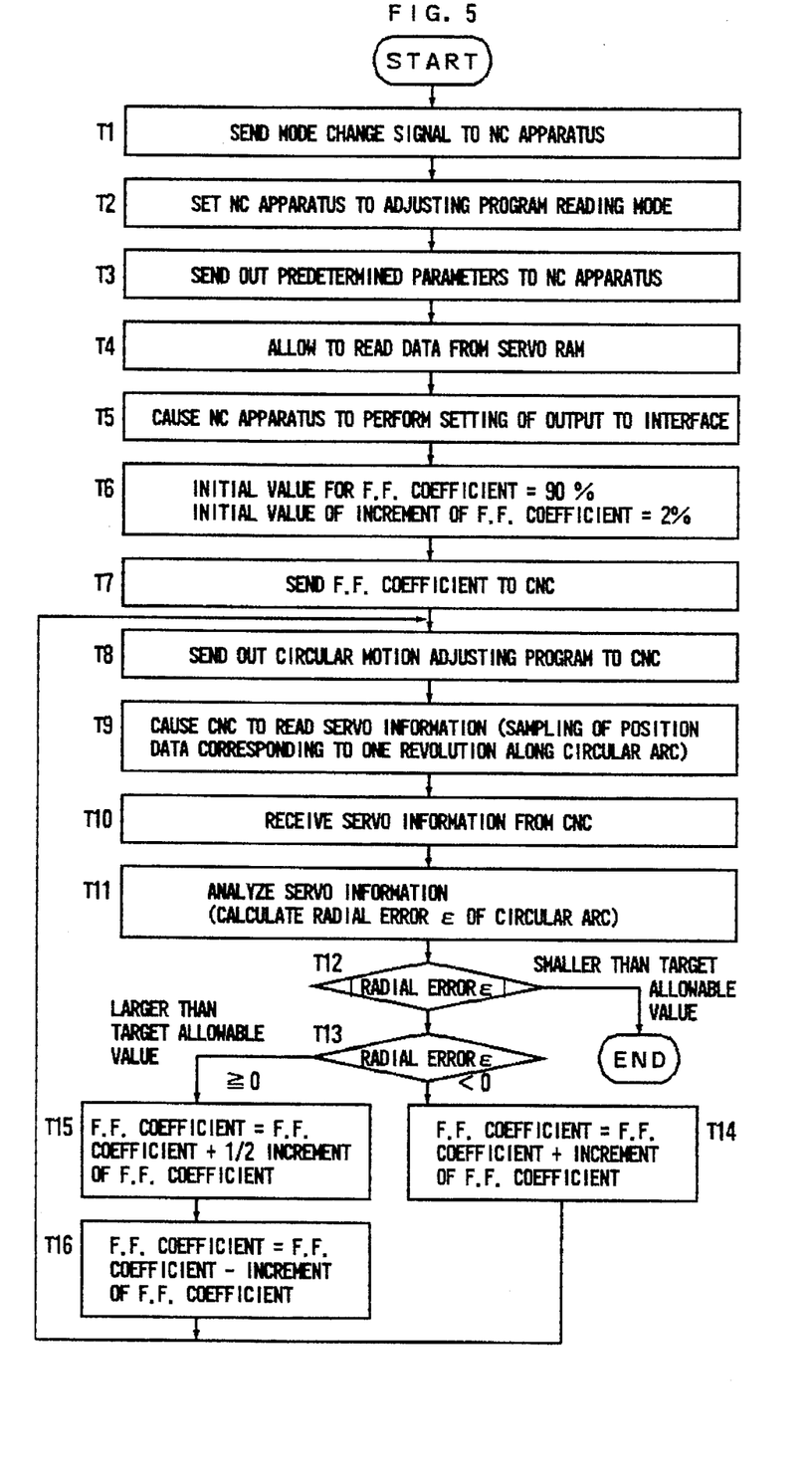
FIG. 5 is a flow chart showing the operating procedure of an automatic adjustment of a feedforward coefficient applied to the circular machining program in accordance with the method of the present invention.

Although the flow chart of FIG. 5 shows only the procedure for adjustment of feedforward coefficient in the circular machining program, it will be readily understood that any other servo parameter in this program can be adjusted in the same manner. Furthermore, the similar adjustment processing can be employed for other programs performing other operations.

Figure 6A:
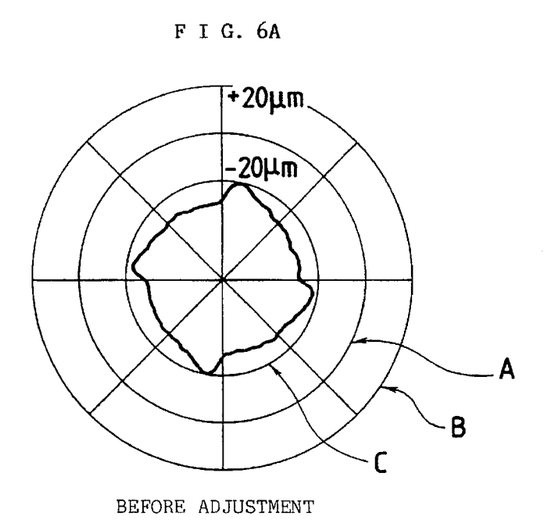
FIGS. 6A through 6C are views explaining the result of the servo parameter adjustment in the circular machining program in accordance with the method of the present invent.
Figure 6B:
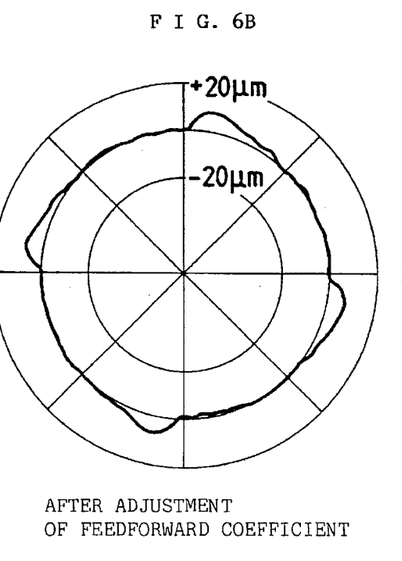
Figure 6C:
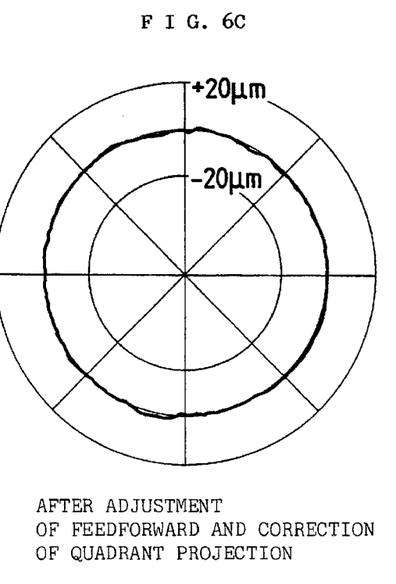

FIGS. 6A through 6C show an example of the effect of the servo parameter automatic adjustment according to the present invention in case where the present invention is applied to the circular machining program under the condition that a commanded radius is 10 mm and a machining speed is 4,000 mm/min. FIG. 8A shows the locus generated in the case where such an adjustment is not carried out, wherein "A" represents the reference locus of 10 mm radius, "B" represents a locus radially deviated by +20 μ from the reference locus, and "C" represents a locus radially deviated by −20 μ from the reference locus.

FIG. 6B shows the result of the servo parameter adjustment with regard to the feedforward coefficient. FIG. 6C shows the result of the servo parameter adjustment with regard to the correction value for correcting quadrant projections as well as the feedforward coefficient.

Figure 7A:
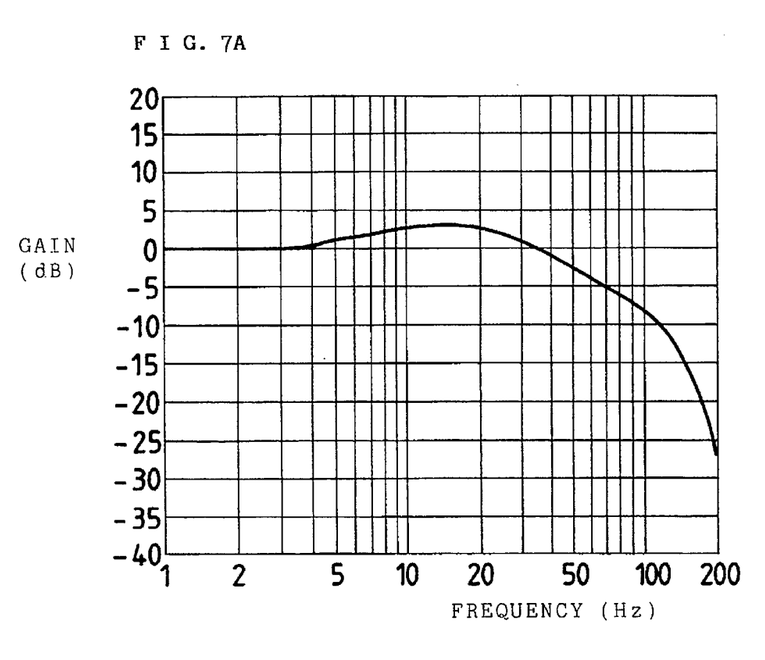
FIGS. 7A and 7B are diagrams showing that the servo parameter automatic adjusting apparatus shown in FIG. 1 can obtain, as servo information, the frequency characteristics of the speed loop in the servo controller.
Figure 7B:
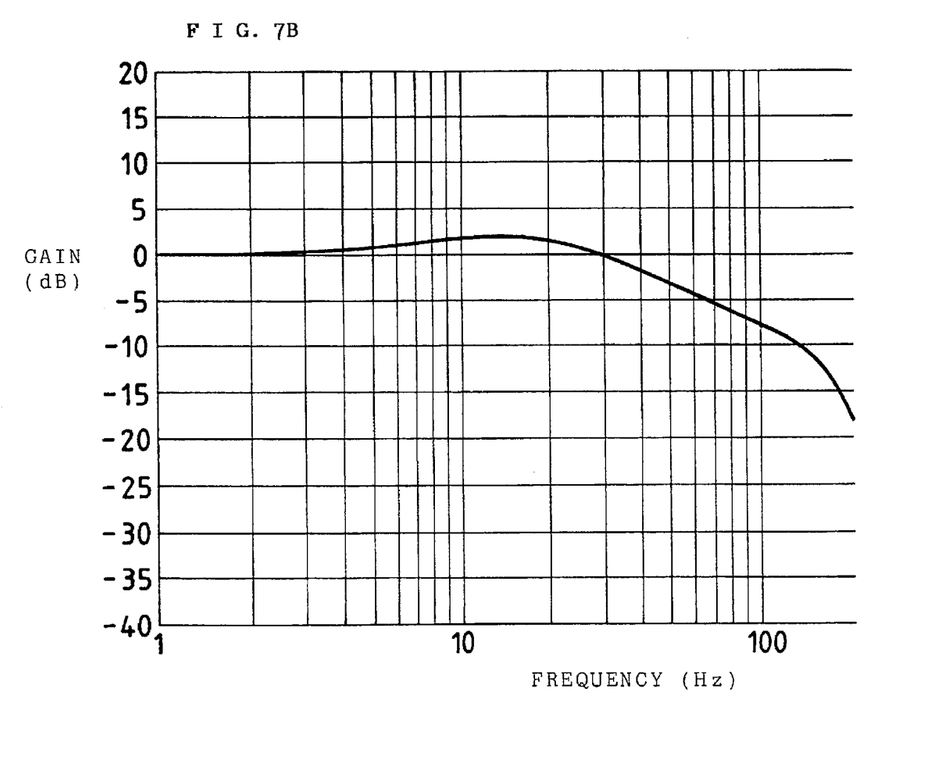

Furthermore, the automatic adjustment of servo parameters in accordance with the present invention makes it possible to obtain the servo information of the servo control system. Thus, the frequency characteristics itself can be measured in case where the servo information includes the frequency characteristics. FIG. 7A shows the frequency characteristics of the speed loop obtained by the servo parameter automatic adjusting system of the present invention. As seen from the result of measurement in FIG. 7A, the result of measurement obtained by the present invention is well comparable to the result of the measurement (shown in FIG. 7B) obtained by using a commercially available frequency characteristics measuring device.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A method for automatically adjusting servo parameters, comprising the steps of:

(a) sending out a servo parameter adjusting program from a servo parameter automatic adjusting apparatus to a servo controller of a servo control system, to cause said servo control system to perform an operation in accordance with said adjusting program and servo parameters presently stored in said servo controller;

(b) outputting servo information obtained when said servo control system performs said adjusting program to said servo parameter automatic adjusting apparatus;

(c) causing said servo parameter automatic adjusting apparatus to receive said servo information and determine whether or not the servo parameter determine set for the execution of said adjusting program is appropriate; and (d) causing said servo parameter automatic adjusting apparatus to perform a renewal adjustment of the servo parameter when determined in step (c) that said servo parameter set for the execution of said adjusting program is not appropriate, thereby renewing the servo parameters stored in said servo controller.

2. The servo parameter automatic adjusting method according to claim 1, wherein determination in said step (c) is made based on the difference between said servo information obtained in said step (b) and a predetermined reference value corresponding to said servo information.

3. The servo parameter automatic adjusting method according to claim 1, wherein, after the servo parameter is renewed in said step (d), a series of said steps (a) through (d) is repeated until the servo parameter is found to be appropriate in said step (c).

4. An apparatus for automatically adjusting servo parameters, comprising:

(a) adjusting program storing means for storing an execution program designed for causing a servo control system to perform a predetermined operation;

(b) program sending-out means for selecting the execution program stored in said adjusting program storing means and sending out the selected execution program to a servo controller;

(c) servo information receiving means for receiving servo information representing the result of the predetermined operation performed by said servo control system based on the program received by said servo controller and servo parameters stored in said servo controller;

(d) servo information analyzing means for judging whether or not the servo information received by said servo information receiving means is appropriate with regard to the response characteristics of the operation of said servo control system; and (e) servo parameter adjusting means for renewing the servo parameter stored in said servo controller based on the result of judgement by said servo information analyzing means.

5. The servo parameter automatic adjusting apparatus according to claim 4, wherein the judgement of said servo information by said servo information analyzing means is made based on the difference between said servo information received by said servo information receiving means of said (c) and a predetermined reference value corresponding to said servo information.

6. The servo parameter automatic adjusting apparatus according to claim 4, wherein said servo information received by said servo information receiving means of said (c) includes information representing a locus of actual operation of the servo control system.

* * * * *